United States Patent [19]

Ukai et al.

[11] Patent Number: 4,507,543
[45] Date of Patent: Mar. 26, 1985

[54] PULSE ARC WELDING METHOD

[75] Inventors: Jun Ukai; Takao Shimizu, both of Aichi, Japan

[73] Assignee: Mitsubishi Denki Kabushiki Kaisha, Tokyo, Japan

[21] Appl. No.: 319,757

[22] Filed: Nov. 9, 1981

[30] Foreign Application Priority Data

Nov. 10, 1980 [JP] Japan .............................. 55-157963
Nov. 10, 1980 [JP] Japan .............................. 55-157962

[51] Int. Cl.³ .............................................. B23K 9/09
[52] U.S. Cl. .......................... 219/137 PS; 219/60 R; 219/125.12; 219/130.51
[58] Field of Search .......... 219/137 PS, 130.5, 130.51, 219/125.12, 130.32, 60 A, 60 R

[56] References Cited

U.S. PATENT DOCUMENTS

| | | | |
|---|---|---|---|
| 3,249,735 | 5/1966 | Needham | 219/130.51 |
| 3,737,614 | 6/1973 | Paulange | 219/130.5 |
| 3,864,542 | 2/1975 | Fletcher et al. | 219/137 PS |
| 4,019,016 | 4/1977 | Friedman et al. | 219/125.12 |
| 4,046,987 | 9/1977 | Hashimoto et al. | 219/130.32 |
| 4,301,355 | 11/1981 | Kimbrough et al. | 219/137 PS |

Primary Examiner—Clifford C. Shaw
Attorney, Agent, or Firm—Sughrue, Mion, Zinn, Macpeak & Seas

[57] ABSTRACT

In a pulse welding method, an optimum pulse current waveform defined by the amplitudes of the current pulse and base current and the width of the current pulse is maintained throughout the welding operation while the average welding current is varied by changing the frequency of the current pulse.

5 Claims, 29 Drawing Figures (A) INPUT OF (71)
(B) OUTPUT OF (71)
(C) OUTPUT (75) FROM (72)
(D) OUTPUT (77) FROM (76)

PULSE ARC WELDING METHOD

BACKGROUND OF THE INVENTION

The present invention relates to pulse arc welding methods. More particularly, the invention relates to improvements in pulse arc welding methods for welding using a current of a pulsive waveform.

In conventional welding employing a non-consumable electrode, i.e. a TIG (tungsten inert gas) pulse arc welding method, welding is conducted by using a current of a rectangular pulse waveform essentially as indicated in FIG. 1. The waveform of this pulse current is determined by four factors, i.e. a pulse current Ip, a base current $I_B$, a pulse duration Tp and a base duration $T_B$.

The advantage of the conventional welding method employing such a pulse current, as is evident from FIG. 1 is that a high current may flow for a short time between the electrode and a workpiece to be welded while the average current $I_M$ is maintained at a low value. Some advantageous features of the TIG welding method for welding by flowing a high current for a short time are that the arc is stable and highly concentrated, penetration is considerably deep and the bead is relatively wide.

In the conventional TIG pulse arc welding method, considerable experience and skill is required in setting the four factors, i.e. pulse current Ip, base current $I_B$, pulse duration Tp and base duration $T_B$, so as to achieve a desired pulse current waveform. This procedure is especially difficult for a beginner who would be required to conduct preliminary experiments to obtain the proper values. Thus, the conventional TIG pulse arc welding method disadvantageously necessitates complicated procedures.

In conventional welding employing a consumable electrode, e.g. MIG (metal inert gas) or MAG (metal active gas) pulse arc welding, the advantage of using a pulse current is that, even if an average current is lower than a critical current, a wire electrode can be finely broken up to form small droplets by means of an electromagnetic contraction force due to the pulse current and the small droplets can be "spray-transferred" to a base material. In the MIG welding operation, when the welding current is increased, the wire is finely broken up or spray-transferred to the base material when the welding current becomes higher than a predetermined "critical current" value. The critical current varies depending upon the material of the electrode wire, the diameter of the wire, the type of shielding gas used, the length of the wire extension, and so forth. As an example, the critical current varies as indicated by a broken line in a graph shown in FIG. 2 employing a wire of soft steel having a diameter of 1.6 mm, a shielding gas of argon +1%-oxygen and a D.C.R.P. of 6 mm of arc. The critical current (abscissa) is plotted vs. the number of particles per second and the volume of the particles per $mm^3$ (ordinates). The average current means an average current value of the pulse current. When the peak current is set to exceed the critical current even if the average current value is lower than the critical current is indicated in FIG. 3, the wire can be spray-transferred to the base material. In FIG. 3, the critical current is indicated by a broken line, and the average current is indicated by a one dot chain line.

The waveform of the pulse current of this type has conventionally had, as indicated in FIG. 4, a pulse frequency $f = 1/T$, a peak current value Ip, a pulse width $\tau$ and a base current $I_B$. Accordingly, in order to select the peak value Ip, the pulse width $\tau$ and the base current $I_B$ to their proper values, considerable experience and preliminary experiments are required in the same manner as in the TIG pulse arc welding method.

When a welding operation is carried out with the conventional pulse arc welding method, it is necessary to set all of the above described factors every time the quantity of heat applied to the wire must be changed during the course of welding, which necessitates a very complicated control system. Particularly when it is necessary to control the quantity of heat applied to the wire in the up slope of the welding current at the start of welding and in the down slope of the welding current in a crater treatment at the end of welding, in the case of maintaining the bead shapes of the respective positions on a circumference of a stationary tube in all-attitude welding, in the case of obtaining a uniform and preferable bead shape when the gap, arc length and aiming position are varied over the entire length of the base material, and in the case of automatically arc welding by providing the end of a wire electrode with an oscillation or like motion in synchronism with the feeding motion of the end of the wire electrode, in the case of switching between a high current and a low current in a frequency pulse welding operation, a number of adjustment volume controls are necessary for setting the above-described four factors to obtain an optimum pulse waveform, thus resulting in excessively complicated manipulations and also resulting in a large-sized and expensive welding machine.

SUMMARY OF THE INVENTION

Accordingly, a primary object of the invention is to provide a pulse arc welding method in which all of the above-described difficulties accompanying a conventional TIG, MIG or MAG pulse arc welding method are eliminated.

A further object of the invention is to provide a pulse arc welding method in which the quantity of heat applied to a wire electrode is controlled in the course of welding in other pulse arc welding methods, such as a plasma arc welding method, in more readily usable and wide applications.

Still another object of the invention is to provide a pulse arc welding method in which the control of applied heat can be remarkably easily conducted and to provide a pulse arc welding machine for executing the pulse arc welding method which is reduced in size.

Briefly, a feature of this invention resides in a pulse arc welding method in which a welding current is varied by constantly maintaining one optimum pulse waveform and varying only the frequency of the pulse. This optimum pulse waveform is selected in accordance with the necessary critical current value, arc maintaining current value, etc, which depend on the properties of the materials used, the shielding gas, and other factors. Once the optimum pulse waveform having a desired peak current, base current and pulse width is selected, the desired average welding current can be maintained by varying only the frequency of the current pulses.

The nature, principle and utility of the invention will become more apparent from the following description when read in conjunction with the accompanying drawings.

and

Figure 21:
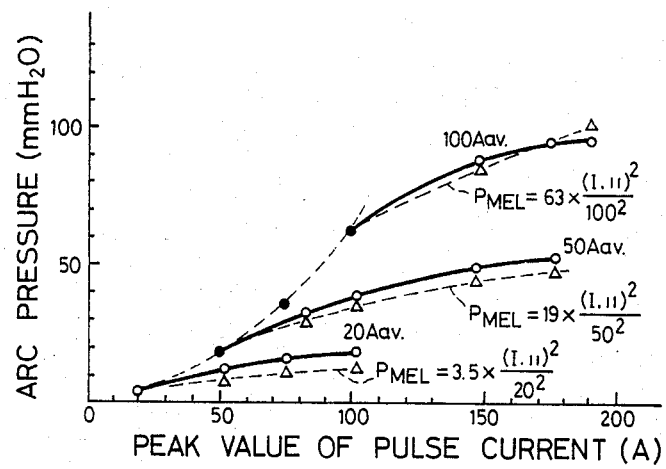

FIG. 21 is a graphical representation indicating various arc pressures with respect to the peak value of the pulse current.

DESCRIPTION OF THE PREFERRED EMBODIMENTS

Figure 1:
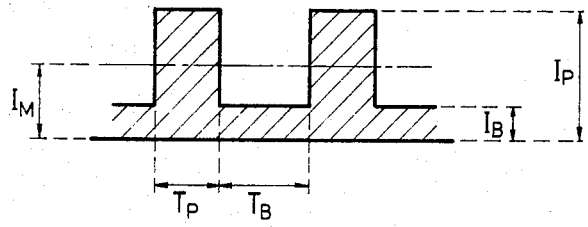
FIG. 1 is a waveform diagram showing a pulse current in a conventional TIG pulse arc welding method.
Figure 2:
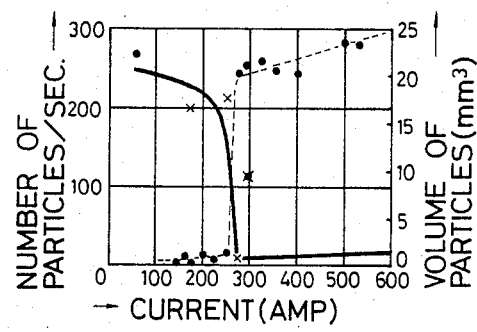
FIG. 2 is a graphical representation indicating critical current values for a welding current in a MIG welding operation in the case where the material of a wire electrode is soft steel, a shielding gas contains argon gas +1%-oxygen, D.C.R.P. is 6 mm arc, and the welding current is varied.
Figure 3:
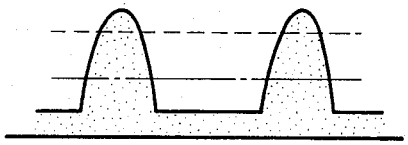
FIG. 3 is a waveform diagram showing the relationship between the peak current and the critical current in the pulse current of a conventional pulse arc welding method.
Figure 4:
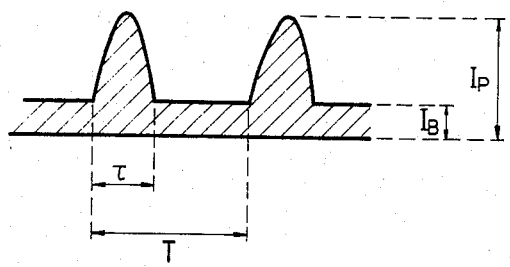
FIG. 4 is a waveform diagram showing a pulse current in a conventional MIG or MAG arc welding method.
Figure 5A:
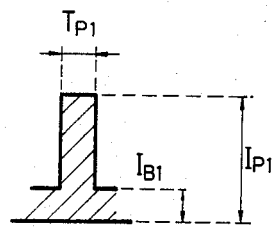
FIG. 5A is a waveform diagram for describing an optimum pulse waveform used for a TIG pulse arc welding method according to the present invention.
Figure 5B:
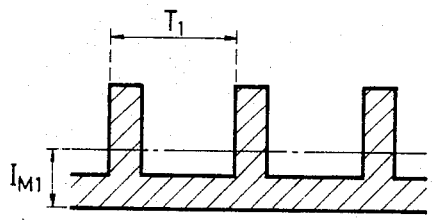
FIGS. 5B and 5C are explanatory diagrams showing the variation of an average current by employing the waveform of the optimum pulse shown in FIG. 5A and changing the frequency of the pulse current.
Figure 5C:
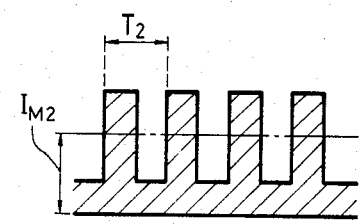

A first preferred embodiment of a pulse arc welding method according to the invention will now be described with reference to FIG. 5A, which shows a waveform of one current pulse applied when TIG pulse arc welding is carried out according to the invention, where $I_{P1}$ indicates a pulse current, $I_{B1}$ indicates a base current and $T_{P1}$ indicates an optimum value for the pulse duration. The values of the pulse current $I_{p1}$ and the pulse duration $T_{P1}$ are so selected so as to sufficiently concentrate and stabilize an arc for the diameter of the tungsten electrode being used. The value of the base current is selected so as not to cause the arc to be extinguished. In this way, the waveform of one optimum current pulse is optimized for the diameter of the tungsten electrode and the material of the base material to be welded. Then, as indicated in FIGS. 5B and 5C, the quantity of heat applied to the wire electrode is controlled by constantly maintaining the waveform of the optimum current pulse as it is and changing only the frequency of the current pulse, thereby readily varying the average current. That is, as indicated in FIG. 5B, when the average current $I_{M1}$ is to be reduced, the period $T_1$, i.e. the pulse interval, of the waveform is increased, thereby decreasing the frequency $f_1$ of the current pulses. On the other hand, as shown in FIG. 5C, when the average current $I_{M2}$ is to be increased, the period $T_2$ of the waveform is decreased, thereby increasing the frequency $f_2$ of the current pulses.

In the TIG pulse arc welding method, when the peak value of the current pulse is increased, the self electromagnetic contraction force of the arc is increased and the density and stiffness of the arc are accordingly increased. Therefore, the arc becomes stable. Thus, the fluctuation of the arc due to the consumption and deformation of the tungsten electrode can be eliminated thereby improving the welding speed and reducing the frequency of exchanging the electrode.

Figure 20:
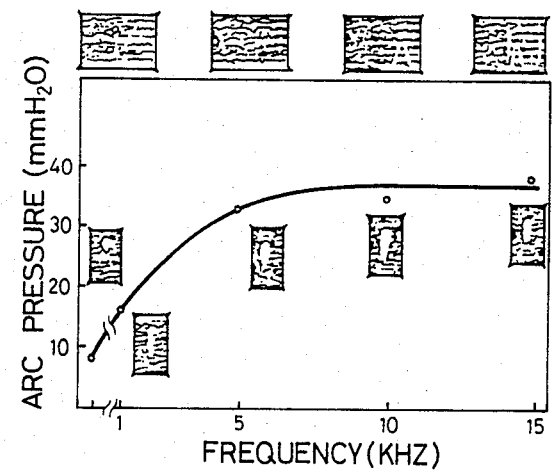
FIG. 20 is a graphical representation indicating an arc pressure with respect to the frequency of the pulse current.

When the arc pressure is measured as an indication of the stiffness of the arc, the results are as indicated in FIGS. 20 and 21 as disclosed in Mitsubishi Giho, Vol. 51, No. 11, 1977. From FIGS. 20 and 21, it can be seen that the stiffness of the arc is remarkable when the frequency of the arc pulse is higher than 5 kHz and when the amplitude of the current pulse is increased while maintaining the same average current.

Figure 6:
FIG. 6 is a waveform diagram showing a pulse current waveform for obtaining a sufficiently stiffened arc in the pulse arc welding method of this invention.

Further, when the pulse arc welding operation is carried out with an average current of less than 100 amperes, a sufficiently stiffened arc can be obtained with the pulse current having the waveform indicated in FIG. 6, wherein the peak of the current pulse is 180 to 200 amperes, the base current is 5 amperes (an arc maintaining current) and the period is less than 200 μsec (calculated reversely from the 5 kHz frequency of the pulse arc).

The pulse width may be selected so as to achieve a minimum average current value in combination with the 5 kHz frequency of the pulse current. When the peak amplitude of the pulse current is set to 200 amperes and the minimum average current value is set to 20 amperes in the above example, the pulse width becomes approximately 30 μsec. When the average current is 100 amperes with the same pulse waveform as before, the frequency of the current pulse becomes approximately 31.7 kHz. That is, the average current can be changed from 20 amperes to 100 amperes by varying the frequency of the pulse current from 5 kHz to 31.7 kHz.

Figure 7:
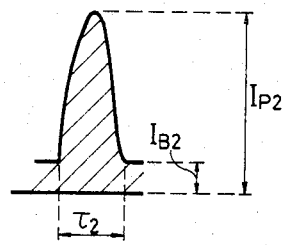
FIG. 7 is a waveform diagram showing an optimum pulse used for an MIG or MAG pulse arc welding method according to this invention.

FIG. 7 shows the waveform of one current pulse applied in an MIG or MAG pulse arc welding operation, where $I_{P2}$ indicates a peak current value, $I_{B2}$ indicates a base current and $\tau_2$ indicates the optimum pulse width value. The peak current $I_{P2}$ and the pulse width $\tau_2$ must be maintained at values at which spray-transfer is stably carried out, but this depends upon the diameter and the material of the wire electrode used, and on the type of the shielding gas, and accordingly may be set beforehand in accordance with experiments or the like. The base current $I_{B2}$ must be selected to a value at which the arc is not extinguished. One optimum pulse waveform can be determined according to these criteria, and then the average current can be changed by varying the frequency of the current pulse, thereby controlling the quantity of the heat applied to the wire electrode, and a stable spray-transfer can thus be carried out regardless of the value of the average current.

Copending and commonly United States application having temporary Ser. No. 281,263 entitled "Pulse Arc Welding Machine" discloses suitable criteria for determining and circuitry for obtaining a desirable current pulse waveform for MIG welding. The disclosure of said application Ser. No. 281,263 is incorporated by reference herein. For MIG welding according to the present invention, the circuitry of said application Ser. No. 281,263 could be employed with minor modification to vary only the pulse frequency in order to control the average current. When an arc welding operation is carried out with the quantity of heat applied to the wire electrode being controlled by using the above-described pulse arc welding method of this invention, the quantity of heat applied to the wire electrode can be controlled while constantly maintaining the optimum waveform of the current pulse, i.e. by controlling the frequency of the pulse current from the start of the welding operation to the end thereof, and only one type of control for setting the frequency of the pulse current is necessary. Thus, the quantity of heat applied to the wire electrode can be controlled by a very easy manipulation.

A specific example of control circuitry for frequency-controlled pulse arc welding according to the present invention will now be described in the context of TIG welding. U.S. Pat. No. 4,046,987, commonly assigned with this application, discloses circuitry for obtaining an optimum current pulse waveform in a TIG pulse arc welding method, and the disclosure of said patent is incorporated herein by reference. In the control circuitry of said patent, specifically FIG. 13 thereof, the pulse width is automatically varied in accordance with the average welding current. For the present invention, this control circuitry can be modified as shown in FIG. 8 herein, so that only the pulse frequency will be varied.

Figure 8:
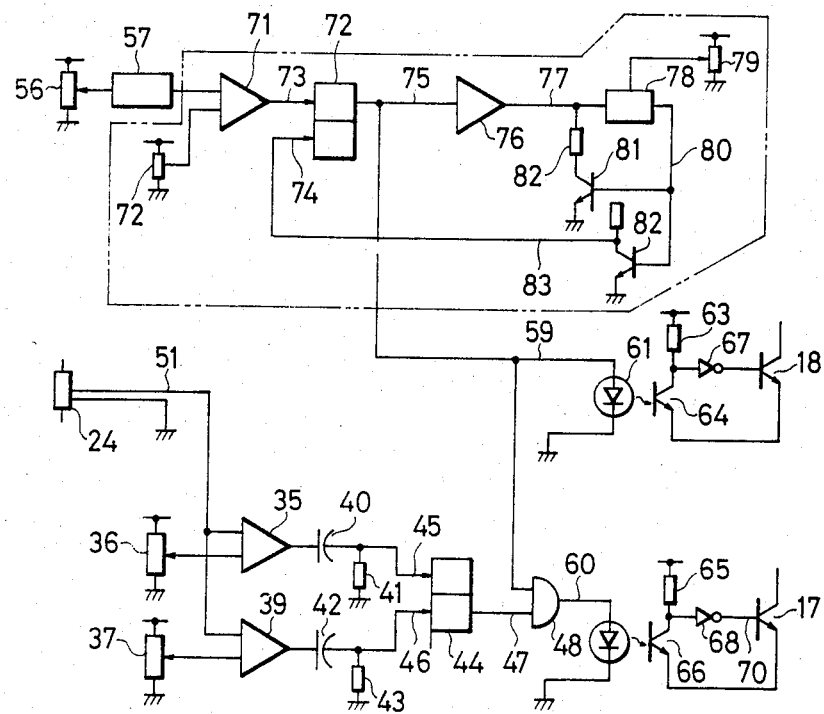
FIG. 8 is a circuit diagram showing the arrangement of an example of a control circuit for obtaining the optimum pulse waveform in the pulse arc welding method of this invention.
Figure 9:
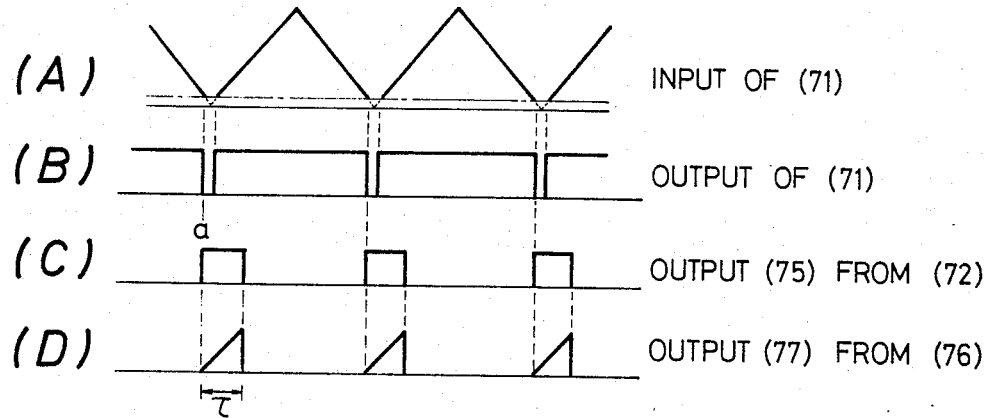
FIGS. 9A–9D are waveform diagrams showing the waveforms of inputs and outputs at various points in the circuit shown in FIG. 8.

In FIG. 8, a frequency generator 57 generates a triangular waveform output as indicated in FIG. 9A. The frequency of this output is controlled in accordance with the value of variable resistor 56. The output from the generator 57 is applied to one input of a comparator 71, and a bias voltage from a resistor 72 is applied to the other input of the comparator 71 for imparting a bias level thereto. Thus, the comparator 71 converts the triangular waveform output from the generator 57 into a rectangular pulse waveform as indicated in FIG. 9B having a valley formed between the rectangular pulses as determined by a dotted broken line in FIG. 9A, i.e. whenever the waveform of FIG. 9A falls below the threshold level of comparator 71. The width of the valley is much smaller than the width of the pulse from comparator 71. The pulse output from the comparator 71 is in turn applied to a flip-flop circuit 72 which is triggered by the high-to-low level transitions at its input. When a pulse output from the comparator 71 is applied to the input terminal 73 of the flip-flop circuit 72, the flip-flop circuit 72 will produce a high level output 75 and when a negative-going transition occurs in the signal applied to the other input terminal 74 of the flip-flop circuit 72, the output 75 from the flip-flop circuit 72 is erased. Thus, when the trailing edge of the pulse current, as indicated by a in FIG. 9B, is applied to the input terminal 73 of the flip-flop circuit 72, the flip-flop 72 will produce an output 75 having a high level. This output 75 from the flip-flop 72 is then applied to an integrator 76, which in turn integrates the output 75 and produces a triangular wave output 77 as indicated in FIG. 9D. The output 77 from the integrator 76 is in turn applied to a trigger circuit 78, which will produce a trigger pulse 80 when the voltage of the triangular input pulse reaches a voltage value determined by a resistor 79. The trigger pulse 80 from the trigger circuit 78 is in turn applied to the base of a transistor 81, which is thereby rendered conductive. Thus, the current 77 of the integrator 76 is discharged through a resistor 82 and the transistor 81. Simultaneously, since the trigger pulse 80 is also applied to a transistor 82, the output 83 of the transistor 82 is decreased to a low level. This low level output 83 of the transistor 82 is applied to the other input terminal 74 of the flip-flop 72, and the output 75 of the flip-flop 72 is thus erased as shown in FIG. 9C. Thus, the integrating operation of the integrator 76 is stopped, and the output 77 of the integrator 76 is erased.

With this operation the output pulse from the flip-flop 72 will be of a constant predetermined duration determined by the time contant of integrator 76 and the threshold of trigger 78. As was described, the output from the flip-flop 72 has a constant width (τ) as indicated in FIG. 9C regardless of the frequency of the output from the frequency generator 57 and this width can be arbitrarily set by changing the value of variable resistor 79.

The pulse output from the flip-flop 72 is in turn applied to a light emitting diode 61 and an AND gate 48 to control the on and off switching of the current pulses. The remainder of the control circuitry operates in the same manner as in said U.S. Patent with resistors 36 and 37 determining the dithering values during the current pulse. For a more detailed understanding of the overall circuit operation, reference may be had to the specification of said U.S. Patent.

With the circuit arrangement of FIG. 8, the frequency of the output signal from frequency generator 57 can be varied in accordance with the desired average current value, to thereby achieve frequency controlled pulse arc welding according to the present invention. Several techniques for providing this desired frequency variation will now be described.

Figure 10:
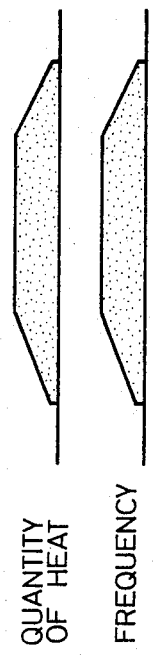
FIG. 10 is a waveform diagram showing the relationship between the pulse current and the corresponding frequency of the pulse current in the pulse arc welding method of the invention.

FIG. 10 shows desired variations in the quantity of heat applied to the wire electrode and the corresponding variations in the frequency of the pulse current in the pulse arc welding method of this invention at the start of the welding operation and at the time of the crater welding operation.

Figure 11:
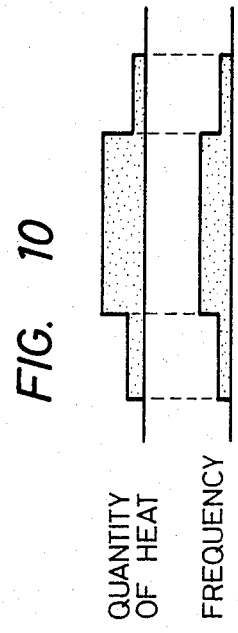
FIG. 11 is a waveform diagram showing the variation of the pulse current and the corresponding frequency of the pulse current in another arrangement of the pulse arc welding method of the invention.

FIG. 11 shows desired variations in the quantity of heat applied to the wire electrode and the corresponding variations in the frequency of the pulse current during the same time periods as in FIG. 10, but FIG. 11 illustrates a different mode wherein the variations are provided gradually rather than stepwise as in FIG. 10.

Figure 12:
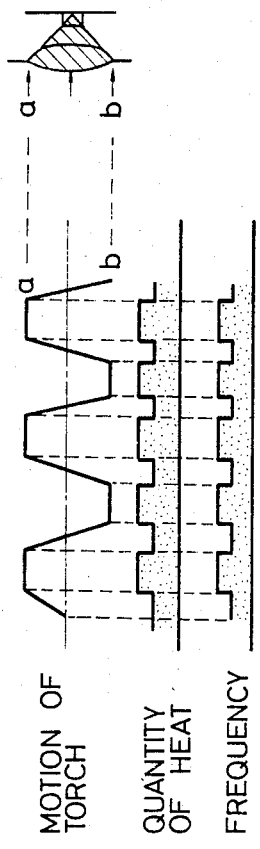
FIG. 12 is a waveform diagram showing the relationship between the motion of a torch, the quantity of heat applied to the wire electrode and the frequency of the pulse current in the pulse arc welding method of the invention.

FIG. 12 shows the relationship between the quantity of heat applied to the wire electrode and the corresponding frequency of the pulse current with reference to the variation of the motion of a torch. As shown in FIG. 12, the frequency, and therefore the applied heat, is decreased during movement of the electrode as it travels across a groove between two workpieces to be joined.

Figure 13:
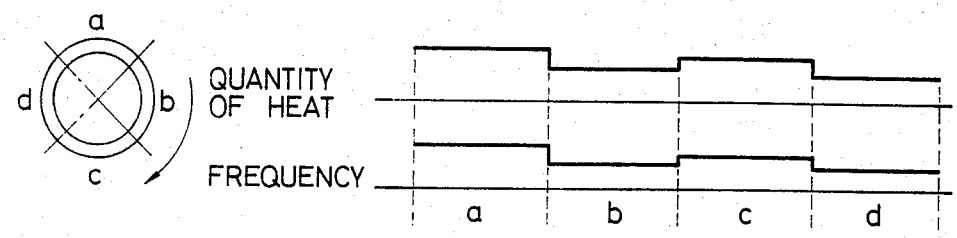
FIG. 13 is a waveform diagram showing the relationship between the quantity of heat applied to the wire electrode and the frequency of the pulse current in the circumferential welding of a stationary tube according to the invention.

FIG. 13 shows the relationship between the quantity of heat applied to the wire electrode and the corresponding frequency of the pulse current when the entire circumference of a stationary tube is welded. The circumference of the tube is divided into four segments, and the quantity of heat applied to the wire electrode is controlled in response to the respective angles of the four divided segments. When the torch passes from one segment to another, the frequency of the pulse current is increased or decreased in a stepwise manner as indicated in FIG. 13.

Circuitry for achieving the frequency variations of FIGS. 10–13 will now be described.

Figure 14A:
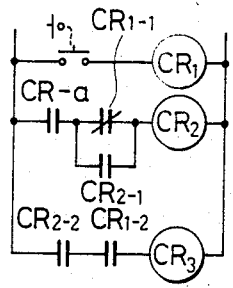
FIGS. 14A and 14B are a circuit diagram showing one example of a circuit arrangement for controlling the frequency of the pulse current in the manner shown in FIGS. 10 and 11.
Figure 14B:
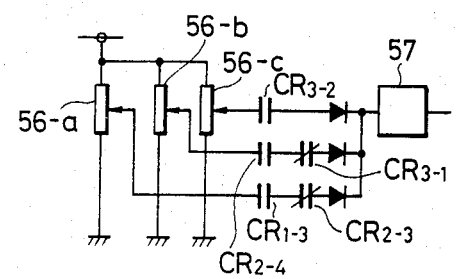

FIGS. 14A and 14B show one example of an arrangement for controlling the frequency of the pulse current in the pulse arc welding method of this invention so as to achieve the variation pattern of FIGS. 10 and 11. A desired number of variable resistors (corresponding to the resistor 76 in FIG. 8) for controlling the frequency of the pulse current are provided and are switched by a controller such as a relay or the like which may be manually or automatically actuated during the welding operation.

Referring first to FIG. 14A, when a trigger switch 90 10 is depressed to commence welding, a relay $CR_1$ is energized to generate an arc in a known manner, e.g. as described in U.S. Pat. No. 4,046,987. When an arc occurs in this manner, the contact CR-a of a current sensing relay (not shown) is closed. When the trigger switch 90 is released, the relay $CR_1$ is deenergized. Accordingly, the normally closed contact $CR_{1-1}$ thereof is closed, and a relay $CR_2$ is energized. Thus, the relay $CR_{1-1}$ is bypassed by the relay contact $CR_{2-1}$, so that the relay $CR_2$ will remain energized as long as the arc is being generated (due to the closed relay CR-a). When the trigger switch 90 is again depressed at the end of welding, the relay $CR_1$ is again energized. Since the relay contact $CR_{2-2}$ is already closed at this time, a relay $CR_3$ is energized when the $CR_{1-2}$ is closed. When the trigger switch 90 is again released, the arc is extinguished by a suitable means (not shown). Accordingly, the relay $CR_2$ is deenergized, and the contact $CR_{2-2}$ is thus opened, and the relay $CR_3$ is deenergized so that all relays are deenergized and the control circuit of FIG. 14A is in a reset state.

Referring now to FIG. 14B, frequency controllers 56-a, 56-b and 56-c are provided for the start, welding time and crater time, respectively.

Figure 15:
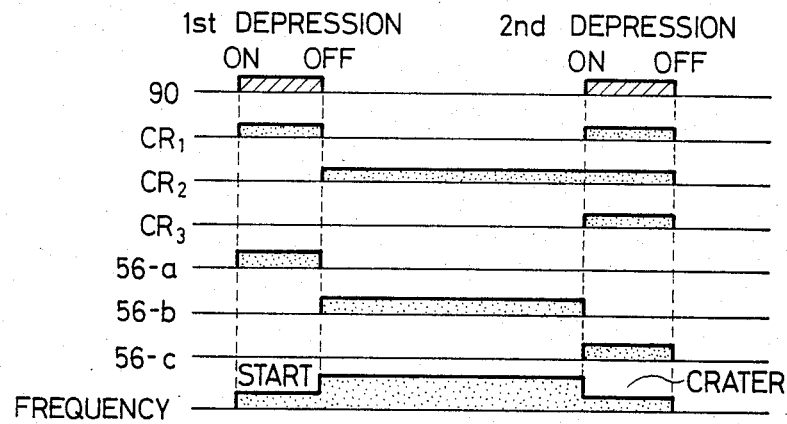
FIG. 15 is a waveform diagram showing the waveform outputs of the various components and the frequency of the pulse current in the circuit shown in FIGS. 14A and 14B.

As is evident from the time chart shown in FIG. 15, the first depression of the trigger switch 90 is conducted during the starting time, and the relay $CR_1$ is closed while the relay $CR_2$ remains open. At this time the frequency controller 56-a provides a predetermined voltage through the contacts $CR_{1-3}$ and $CR_{2-3}$ to a frequency generator 57. A welding operation is conducted during the time when the trigger switch 90 is released, which release results in the relay $CR_2$ being energized while the relay $CR_3$ is deenergized as described above. During this time, the frequency controller 56-b provides a predetermined voltage through the contacts $CR_{2-4}$ and $CR_{3-1}$ to the frequency generator 57. The second depression of the trigger switch 90 is conducted during the crater time, and the relay $CR_3$ is energized so that the frequency controller 56-c provides a predetermined voltage through the contact $CR_{3-2}$ to the frequency generator 57. Thus, the trigger switch is turned on or off thereby switching the frequency controller for controlling the frequency of the pulse current in the pulse arc welding method.

Figure 16:
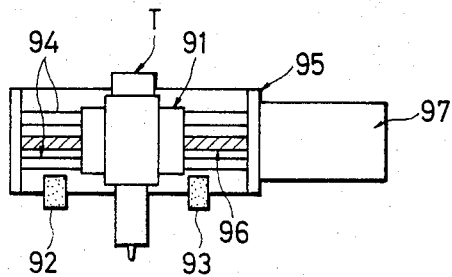
FIG. 16 is an explanatory diagram showing one example of the arrangement for controlling a torch in the pulse arc welding method of the invention.
Figure 17A:
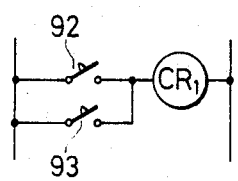
FIGS. 17A and 17B are circuit diagrams showing one example of a circuit arrangement for operating with the component shown in FIG. 16 to achieve the variation pattern of FIG. 12.
Figure 17B:
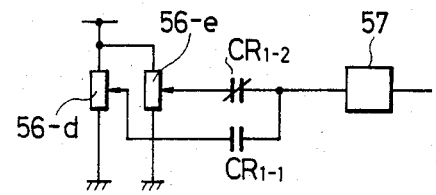

FIG. 16 shows an example of an arrangement for stopping the torch at both ends of a groove of the base material, and FIGS. 17A and 17B show control circuits for operating the arrangement shown in FIG. 16 to achieve the operation illustrated in FIG. 12. A setting unit 56-a is provided to apply a voltage signal to the generator 57 such that the latter will generate a high frequency signal at both ends of the groove of the base material. A setting unit 56-e is provided to apply a voltage signal which will cause the generator 57 to output a lower frequency signal as the torch moves over the groove of the base material. A slide piece 91 carrying the torch is movable along guide bars 94 to turn on a limit switch 92 or 93 at each stopping end. The slide piece is moved via a screw element 96 rotated by motor 97 mounted to base 95. When either limit switch 91 or 93 is turned on, the relay $CR_1$ is energized, and the setting unit 56-d provides a predetermined voltage through the contact $CR_{1-1}$ to the frequency generator 57. When the torch T begins moving in the opposite direction, the limit switch previously turned on is now turned off, and the relay $CR_1$ is deenergized until the limit switch is closed by the slide piece reaching the other end. In the meantime, the setting unit 56-e provides a predetermined voltage through the contact $CR_{1-2}$ to the frequency generator 57. Thus, the heat of the welding operation is increased when the torch stops at both ends of the groove of the base material to melt the base material so that it will fill the groove, while the heat is decreased as the torch passes over the groove itself to prevent the torch from burning through. The means for controlling the rotation of the motor 97 in response to activation of the limit switches 92, 93 is well known in the art and need not be described herein.

Figure 18:
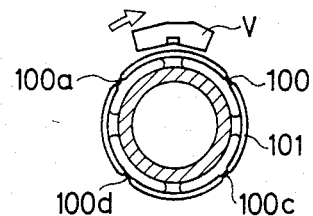
FIG. 18 is an explanatory diagram showing one example of an arrangement for welding the entire circumference of a stationary tube by the pulse arc welding method of the invention.
Figure 19A:
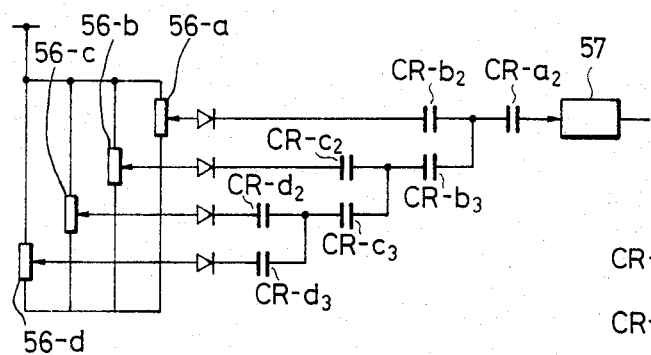
FIGS. 19A and 19B are circuit diagrams showing one example of a circuit arrangement for operating with the component shown in FIG. 18 to achieve the variation pattern shown in FIG. 13.
Figure 19B:
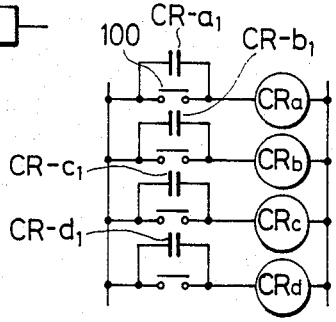

FIGS. 18 and 19A and 19B show an example of welding the entire circumference of a stationary tube. The circumference of the stationary tube is divided into four segments, and magnetic switches 100 are buried in rails 101 of the respective segments of the stationary tube. The magnetic switch 100 is so constructed as to close when a truck V moves directly above the switch 100. When the magnetic switch 100 is once closed to close a respective one of the relays CR-a through CR-d, said respective relay is held closed by its own contacts. Accordingly, even if the truck V has passed over the magnetic switch 100 and the corresponding magnetic switch is then turned off, the corresponding relay remains energized. Assume that the truck now starts from the point a, the magnetic switch 100a is first closed, and the relay CR-a is closed. Accordingly, the frequency setting unit 56-a is controlled to apply a predetermined voltage through the contacts CR-b2 and CR-a2 to the frequency generator 57. when the truck is then moved to the point b, the magnetic switch 100b is closed, and the relay CR-b is closed. As a result, the contact CR-b2 is opened while the contact CR-b3 is closed. Accordingly, the frequency setting voltage is switched from the unit 56-a to 56-b. In this manner the setting unit is sequentially switched from the units 56-a to 56-d while the truck is moved circumferentially over the stationary tube.

In the above-described respective examples, only one type of optimum pulse waveform is employed to control the quantity of heat applied to the wire electrode in the pulse arc welding method, but the pulse arc welding method of the invention is not limited only to this, but several types of predetermined optimum pulse waveforms can also be employed with changeover switches or the like in response to the diameter of a tungsten electrode used in a TIG pulse arc welding method, the material and the thickness of the base material or in response to the diameter and the material of the wire electrode used in an MIG or MAG pulse arc welding method, or in response to the type of a shielding gas, to provide a wider range of applications.

It should be noted that although the foregoing description is directed only to the TIG and MIG or MAG arc welding methods, the invention can also be applied with the same effects to a plasma arc welding method.

It should be appreciated from the foregoing description that since, according to the pulse arc welding method of the present invention, the quantity of heat applied to the wire electrode can be controlled to various levels by setting a pulse waveform to a predetermined optimum waveform and changing only the frequency of the pulse current, thereby varying the average current of the pulse current, only a single easily operated control means need be provided to control the applied heat, and the pulse arc welding machine for carrying out the pulse arc welding method of this invention can be advantageously reduced in size.

What is claimed is:

1. In a pulse arc welding method of the type wherein a welding current is applied between a base material and a wire electrode which may be moved relative to said base material, said welding current comprising a base current level upon which is periodically superimposed a current pulse, said current pulse having a waveform defined by its pulse width, and its amplitude in excess of said base current level, the improvement comprising the steps of: setting said current pulse amplitude and said pulse width and said base current level to particular values defining an optimum current pulse waveform; said base current level being set to a value which allows an arc to be maintained regardless of a frequency of said pulse; and, varying the average value of said welding current while maintaining a constant current pulse waveform by varying the frequency of the current pulses superimposed on said base current level, said frequency varying step comprising increasing the current pulse frequency when said electrode is stationary with respect to said base material and decreasing said frequency when said electrode moves with respect to said base material.

2. The method as claimed in claim 1, wherein said electrode is consumable.

3. The method as claimed in claim 1, wherein said electrode is non-consumable.

4. The method as claimed in claim 3, wherein said electrode is tungsten and the welding method is a TIG welding method.

5. The method as claimed in claim 3, wherein said welding method is a plasma arc welding method.

* * * * *